3,171,833
METHOD OF PREPARING 1-GLUCOSYL-6-
AZAURACILS
František Šorm and Miroslav Prystaš, both of Prague,
Czechoslovakia, assignors to Spofa, sdruzeni podniku
pro zdravotnickou vyrobu, Prague, Czechoslovakia
No Drawing. Filed Jan. 9, 1962, Ser. No. 165,215
Claims priority, application Czechoslovakia,
Jan. 10, 1961, 138/61
12 Claims. (Cl. 260—211.5)

The invention relates to a method of preparing 1-glycosyl-6-azauracils of the general formula

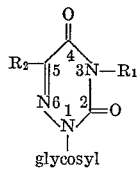

wherein $R_1$ signifies hydrogen, alkyl of 1–4 carbon atoms or aralkyl, e.g. benzyl or diphenylmethyl, wherein $R_2$ is hydrogen or alkyl of 1–4 carbon atoms, and "glycosyl" represents a sugar moiety, e.g. ribosyl or desoxyribosyl.

Among the 1-glycosyl-6-azauracils of the general formula above, the 6-azauridine (6-azauracil riboside), particularly, in recent years has assumed a very important place among antimetabolites used as cancerostatics. The mechanism of its effect has to a great extent been explained (J. Škoda, F. Šorm, Coll. Czech. Chem. Commun. 24, 1331, 1959; J. Škoda, J. Kára, J. Šormová, ib., 24, 3783, 1959; R. E. Handschumacher, C. H. Pasternak, Biochim. Biophys. Acta, 30, 451, 1958).

Up to the present, 6-azauridine was obtainable exclusively by biochemical means (Czech. Pat. No. 88,063), which gives good yields, it is true, but requires relatively bulky and special apparatus and involves a rather complicated isolation process. Therefore, it is of considerable importance to provide a synthetic preparation of 6-azauridines. The preparation of 6-azauridines substituted in positions 3 and/or 5, or azauracil derivatives having another sugar moiety in the 1 position, is not yet known.

The synthesis of analogous uracil ribosides and their derivatives has been successfully effected by condensation of their mercuric or chloromercuric salts with 2,3,5-tri-O-benzoyl-D-ribofuranosyl chloride (J. J. Fox et al., J. Am. Chem. Soc. 78, 2117, 1956). The ribose residue enters in this case in the 1 position (similarly as is the case with natural ribosides), the yields are, however, relatively low due to the fact that condensation in a toluene or xylene medium is not performed in homogeneous phase, but in suspension.

For the preparation of 6-azauracil ribosides and their 5-alkyl derivatives, this method cannot be used, since in this case the ribose residue enters mainly into the 3 position, and only to a small extent into the desired 1 position. Furthermore, the desired substance is thus obtained in low yield, and requiring in addition isolation from a mixture of two or three ribosides. This appears both from the attempted synthetic preparation of 6-azauridine (R. E. Handschumacher, J. Biol. Chem. 235, 764, 1960) and 5-methyl-6-azauridine (R. H. Hall, J. Am. Chem. Soc. 80, 1145, 1958), and from studies on the course of alkylation of the 6-azauracil (J. Gut et al., Coll. Czech. Chem. Commun., presently in press).

The method of preparing 1-glycosyl-6-azauracils, which is the subject of the present invention, does not result in the above mentioned difficulties. According to this method, 1-acyl-6-azauracils are converted by alkylation, preferably by action of diazo alkanes, to 1-acyl-3-alkyl-6-azauracils, or to 1-acyl-3-aralkyl-6-azauracils, mercuric or chloromercuric salts thereof are then prepared, and the same are converted by action of the esters of glycosyl halides to esters of 1-glycosyl-3-alkyl-6-azauracils, or to esters of 1-glycosyl-3-aralkyl-6-azauracils, from which the corresponding 1-glycosyl-3-alkyl-6-azauracils or 1-glycosyl-3-aralkyl-6-azauracils are prepared.

The conversion of 1-glycosyl-3-alkyl-, or 1-glycosyl-3-aralkyl-6-azauracil esters to the corresponding 1-glycosyl-3-alkyl-, or 1-glycosyl-3-aralkyl-6-azauracils can be effected either by hydrolysis, e.g. by action of aqueous or aqueous-alcoholic solutions of alkali metal hydroxides, or by alcoholysis, e.g. by action of methanol in the presence of sodium methylate, or by ammonolysis, e.g. by action of ammonia in ethanol.

Esters of 1-glycosyl-3-diphenylmethyl-6-azauracils can be split by hydrogenolysis and converted further to 1-glycosyl-6-azauracils by means of hydrolysis, alcoholysis or ammonolysis.

For the preparation of 1-glycosyl-5-alkyl-6-azauracils, or of 1-glycosyl-3,5-dialkyl-6-azauracils or 1-glycosyl-3-aralkyl-5-alkyl-6-azauracils, 1-acyl-5-alkyl - 6 - azauracils can be used as the starting compounds.

The preparation method according to the invention is illustrated by the equations below, according to which the reaction sequence leads, on the one hand, to 6-azauracil riboside (I), and on the other hand, to its 3-alkyl-, or 3,5-dialkyl derivative (II). In this case acetic anhydride is used for the transitory acylation in the 1 position, the hydroxyl groups of the sugar component being blocked or protected by benzoylation.

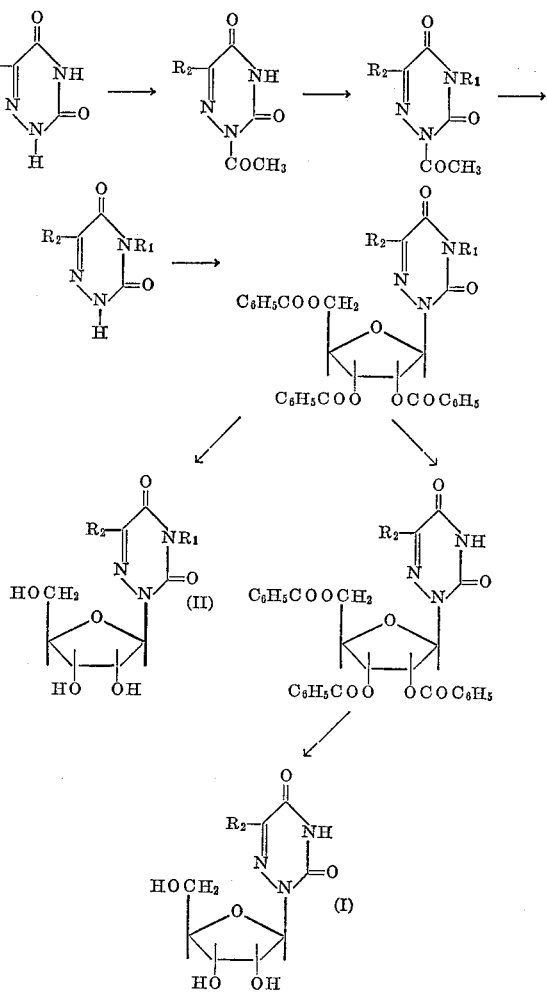

In the experimental elaboration of the method according to the invention it was found that by a permanent or temporary substitution of the 3 position the sugar moiety, e.g. the ribose residue, positively enters into the 1 position of the 6-azauracil nucleus. For this purpose alkylation of 6-azauracil by means of diazo methane or its aryl derivatives, respectively, proved useful, in which case the alkyl, or the aralkyl, enters in the 3 position. It is still more advantageous to start from an 1-acyl-6-azauracil, particularly from the 1-acetyl-6-azauracil, which is substantially more reactive, and then split off the acyl group.

In the reaction of mercuric, or as the case may be, chloromercuric salts of 3-substituted 6-azauracils with glycosyl halide esters, e.g. with 2,3,5-tri-O-benzoyl-D-ribofuranosyl chloride, the sugar moiety clearly enters into the 1 position.

The aforementioned substitution of 6-azauracil in the 3 position, in addition to the directing influence, also a favorable influence on the solubility of the mercuric salts in the reaction medium. Thus, e.g. the mercuric salt of 3-diphenylmethyl-6-azauracil is easily soluble in toluene, so that the ribosidation can take place in a homogeneous medium. This circumstance favorably influences both the reaction rate and the yield. The 3-diphenyl-methyl-6-azauridine tribenzoate thus obtained can be subsequently converted by means of hydrogenolysis, e.g. by catalytic hydrogenation in the presence of palladium on activated carbon (i.e. palladiumized carbon catalyst) to the 6-azauridine tribenzoate. It is essential that hydrogenation proceeds without attacking the double bond in the position 5,6 on the 6-azauracil nucleus.

The above described process can be applied as well to analogous derivatives of 6-azauracil which are alkylated in the 5 position. Instead of the 2,3,5-tri-O-benzoyl-D-ribofuranosyl chloride there can be used other glycosyl halides having their hydroxyl groups blocked by acylation (e.g. the corresponding desoxyribose, and psicose derivatives, and the like).

All the acyl derivatives of the cited nucleosides can be converted to free glycosides by known methods (hydrolysis, ammonolysis or alcoholysis).

Judging from analogous ribosidations of purine or pyrimidine bases it can be presumed that in the case of ribosidation of 3-substituted 6-azauracils the β-anomer is likewise formed. The identity of the steric course of the synthetic and biochemical ribosidation on the 6-azauracil nucleus follows also from the fact that by benzoylation of the biochemically prepared 6-azauridine and the subsequent methylation with diazo methane, the identical product was obtained as with the reaction of the chloromercuric salt of 3-methyl-6-azauracil with 2,3,5-tri-O-benzoyl-D-ribofuranosyl chloride (M. Prystaš, F. Šorm, Coll. Czech. Chem. Commun., presently in press).

apparatus or in the standard equipment of pharmaceutical production plants.

EXAMPLES

Example 1

A mixture of 4 g. 6-azauracil and 50 g. of acetic anhydride is heated for 45 minutes under boiling and the solution is then concentrated in vacuo to a quarter of the initial volume. Crystalline 1-acetyl-6-azauracil is eliminated. Yield 5.3 g., i.e. 98% M.P. 149° C. The pure product melts at 151° C.

To a mixture of 2 g. of 1-acetyl-6-azauracil in 30 ml. of absolute dioxane 35 ml. of ethereal solution of diazo methane corresponding to 0.43 M is added under cooling. After 5 minutes the solution formed is evaporated in vacuo. By crystallization of the dry residue from a benzene and petroleum ether mixture 3-methyl-1-acetyl-6-azauracil in 95% yield is obtained, M.P. 99–100° C., no change on recrystallization.

1 g. of 3-methyl-1-acetyl-6-azauracil is heated together with a mixture of 0.1 ml. 0.2 N HCl and 25 ml. of 50%-aqueous ethanol for 10 minutes under boiling. After cooling down, the reaction mixture is evaporated and the residue is recrystallized from water. There is obtained 0.71 g., i.e. 95% of 3-methyl-6-azauracil, M.P. 169° C.

To a solution of 1.27 g. of 3-methyl-6-azauracil and 2.72 g. of mercuric chloride in 100 ml. of 50%-aqueous ethanol, 10 ml. of 1 N NaOH is added during 40 minutes under stirring at 35° C. The suspension is concentrated in vacuo to a volume of 10 ml., and after 2 days the precipitate formed is sucked off, washed with ethanol and water. The yield of 3-methyl-6-azauracil chloromercuric salt varies from 70–75%.

A suspension of 0.36 g. of 3-methyl-6-azauracil chloromercuric salt in 150 ml. anhydrous toluene is heated under boiling for 10 minutes while stirring. Thereupon 50 ml. of the solvent is slowly distilled off, until the distillate is quite clear. To the suspension is then added a solution of 2,3,5 - tri - O - benzoyl - D - ribofuranosyl chloride (prepared from 0.51 g. of 1-O-acetyl-2,3,5-tri-O-benzoyl-β-D-ribofuranose) in 3 ml. anhydrous toluene, and the mixture is kept boiling for 2 hours. On cooling down the suspension is filtered off and the filtrate shaken twice, each time with 2 ml. of 20% aqueous solution of potasisum iodide and three times with 10 ml. each of water. After drying with anhydrous sodium sulfate the toluene solution is evaporated in vacuo, and the dry residue is chromatographed on 35 g. alumina of II–III activity (according to Brockmann) in benzene and ethyl acetate. The fractions extinguishing fluorescence in ultraviolet light when applied on filter paper are collected and evaporated. The dry residue is chromatographed again on 30 g. alumina of II activity (Brockmann) in the same solvents. The frac-

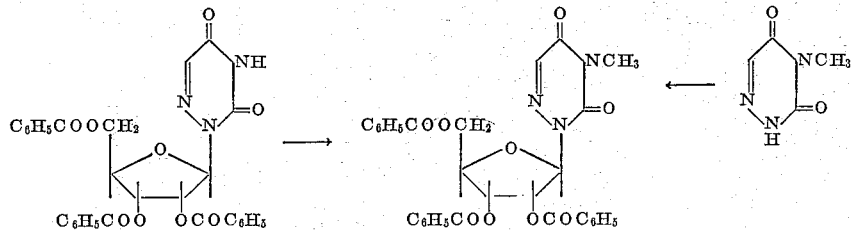

In the use of other acylated glycosyl halides it can be expected that the steric course of the reaction will be directed as well by known rules. Thus, e.g. the respective derivative of desoxyribose gives a mixture of α- and β-anomers.

Although the process according to the invention involves synthesis of a fairly complicated substance, its performance does not require special apparatus. All the process steps can be carried out in current laboratory tion obtained by elution with a mixture benzene-ethyl acetate (19:1) is evaporated, and by crystallization of the dry residue from ethanol, 3-methyl-6-azauridine tribenzoate, melting at 129–130° C., is obtained in 40% yield. On twofold recrystallization the product melts at 130–131° C.

1.60 g. of 3-methyl-6-azauridine tribenzoate are added to a solution of sodium methylate (prepared by dissolving 0.03 g. of sodium in 15 ml. absolute methanol), and the reaction mixture is heated under boiling for 5 hours. After cooling down a cation-exchanger in the hydrogen cycle (e.g. Dowex-50) is added to the solution up to neutral reaction, filtered off, and the filtrate evaporated to dryness. The residue is diluted with water and extracted with chloroform. The aqueous solution is evaporated in vacuo and the residue crystallized from ethanol. There is obtained 0.68 g. (94%) of 3-methyl-6-azauridine, M.P. 124° C., not changing by further recrystallization from ethanol.

*Example 2*

To a solution of 1.3 g. of 1-acetyl-6-azauracil in 20 ml. of absolute dioxane a solution of 2.4 g. of diphenyldiazo methane in 30 ml. of absolute dioxane is added in four dosess during 8 hours at 60° C. Next day the excess diphenyldiazo methane is destroyed by addition of a drop of 5 N HCl. 20 ml. of ethanol are added to the decolorized reaction mixture and the same heated for 20 minutes under boiling. The mixture is evaporated in vacuo and the dry residue dissolved in chloroform. The chloroform solution is extracted with 40 ml. of 5%-sodium hydroxide solution, the alkaline extract is washed with chloroform, acidified with 5 N HCl, and again extracted with chloroform. The dried chloroform solution is evaporated in vacuo, and from the dry residue, by crystallization from 25%-aqueous ethanol, 1.70 g. (72%) of 3-diphenylmethyl-6-azauracil, M.P. 185° C., are obtained. The pure substance melts at 185–186° C.

The solution of 1.35 g. of 3-diphenylmethyl-6-azauracil in mixture with 4.95 ml. of 1 N NaOH and 5 ml. ethanol is added dropwise during 20 minutes under stirring to a solution of 0.67 g. of mercuric chloride in 25%-aqueous ethanol. A gel-like precipitate immediately eliminates, which next day is sucked off and washed with 15 ml. of lukewarm water. The yield of the mercuric salt varies within the range of 1.60–1.74 g. (92–100%).

The solution of 0.70 g. (0.93 mM.) of 3-diphenylmethyl-6-azauracil mercuric salt in 150 ml. of toluene is heated for 5 minutes under boiling, and thereupon the solvent is slowly distilled off until the distillate (50 ml.) is quite clear. A solution of 2,3,5-tri-O-benzoyl-D-ribofuranosyl chloride (1.63 mM., prepared from 0.90 g. of 1-O-acetyl-2,3,5-tri-O-benzoyl-β-D-ribofuranose) in 4 ml. of toluene is added to the still hot solution. The solution is then kept boiling for 3 hours and then concentrated to 50 ml. volume. After cooling down, the toluene solution is extracted two times with 10 ml. each of 30%-aqueous solution of potassium iodide and four times with 20 ml. each of water. The dried toluene solution is evaporated in vacuo, and the dry residue (1.35 g.) is chromatographed on 150 g. alumina of II–III activity (Brockmann) in petroleum ether, carbon tetrachloride and benzene. The benzene fraction is evaporated (0.72 g., 61%) and the dry residue is crystallized from ethanol. There is obtained 3-diphenylmethyl-6-azauridine tribenzoate, M.P. 119° C.

0.10 g. of 3-diphenylmethyl-6-azauridine tribenzoate is hydrogenated at 65° C. on 0–20 g. of 5%-palladium on activated carbon in 20 ml. ethanol. After 1 hour the hydrogenation mixture is filtered, evaporated in vacuo, and the dry residue is crystallized from ethanol. There is obtained 6-azauridine tribenzoate, M.P. 187° C., in 80% yield.

0.30 g. of 6-azauridine tribenzoate is heated with 20 ml. of an 5%-ethanolic solution of ammonia for 5 hours at 95° C. The reaction mixture is then evaporated, the dry residue extracted with 10 ml. of water and the aqueous layer extracted two times with 20 ml. each of chloroform. The aqueous solution is evaporated and the dry residue crystallized from ethanol. There is obtained 6-azauridine, M.P. 161° C., in 51% yield.

0.30 g. of 6-azauridine tribenzoate is heated with a solution of sodium methylate (prepared by dissolving 0.03 g. of sodium in 15 ml. of absolute methanol) for 4–5 hours under boiling. After cooling down, a cation-exchanger in the hydrogen cycle (e.g. Dowex-50) is added to the solution up to neutral reaction, filtered, and the filtrate evaporated in vacuo. The dry residue is extracted with 10 ml. of water and extracted two times with 10 ml. each of chloroform. The aqueous solution is evaporated in vacuo, and the dry residue is crystallized from ethanol. There is obtained, 6-azauridine, M.P. 161° C., in 90% yield.

*Example 3*

A mixture of 2.54 g. of 5-methyl-6-azauracil and 6.50 g. of trifluoracetic anhydride is heated under boiling until complete dissolution (80 minutes) and thereupon at 55° C. bath temperature for an additional 70 minutes. The reaction mixture is diluted with 50 ml. toluene and evaporated in vacuo. The oily residue is dissolved in 50 ml. of toluene and evaporated in vacuo. The crystalline residue is dissolved in 50 ml. of hot toluene, evaporated in vacuo, and this operation is repeated twice more. There is obtained 5-methyl-1-trifluoracetyl-6-azauracil in 4.45 g. yield, melting at 101° C. The pure product melts at 104–106° C. (toluene).

4 g. of crude 5-methyl-1-trifluoracetyl-6-azauracil are dissolved in 60 ml. of hot toluene, and to the solution, after cooling, a solution of 7 g. of diphenyldiazo methane in 50 ml. of anhydrous toluene is slowly added during 1 minute, at room temperature. Next day the excess diphenyldiazo methane is decomposed by the addition of 1.5 ml. N HCl, the reaction mixture diluted with 5 ml. ethanol and boiled for 20 minutes. The yellow solution is then evaporated in vacuo, the dry residue is dissolved in 50 ml. chloroform. The chloroform solution is shaken twice each time with 50 ml. of water and thereupon 10 times, each time with 60 ml. of 2 N NaOH. The alkaline extracts are washed with chloroform and neutralized under cooling with dilute hydrochloric acid using Congo red for indicator. The oily product is extracted with chloroform and the extract after drying with anhydrous sodium sulfate is evaporated in vacuo. From the dry residue recrystallized from an ethanol-water mixture (1:1) 5-methyl-3-diphenylmethyl-6-azauracil in 3.37 g. (64%) yield, M.P. 168° C., is obtained.

A solution of 2.9331 g. of 5 methyl-3-diphenylmethyl-6-azauracil in mixture with 20 ml. 0.5 N KOH and 20 ml. of ethanol is added dropwise during 15 minutes to a solution of 1.3576 g. of mercuric chloride in 100 ml. of water. Next day the precipitate is heated to 70° C. and allowed to cool slowly. Thereupon it is sucked off and washed with 200 ml. of lukewarm water. There is obtained 3.80 g. (97%) mercuric salt of 5-methyl-3-diphenylmethyl-6-azauracil.

A solution of 1.57 g. of mercuric salt of 5-methyl-3-diphenylmethyl-6-azauracil in 200 ml. xylene is azeotropically dried by distilling off 70 ml. of the solvent. To the anhydrous solution a solution of 2.35 g. of 2,3,5-tri-O-benzoyl-D-ribofuranosyl chloride in 20 ml. xylene is added and the mixture formed is boiled for 4 hours. On cooling down the reaction mixture is washed twice, each time with 50 ml. 20% potassium iodide aqueous solution, and three times with water. The dried xylene solution is evaporated and the dry residue is chromatographed on neutral alumina (300 g.) of II–III activity (Brockmann) in carbon tetrachloride, benzene and ethyl acetate. The benzene fraction that on application to filter paper extinguishes the ultraviolet light fluorescence are joined and evaporated. From the dry residue, by crystallization from a benzene-ethanol mixture (1:7), there is obtained 0.74 g. (25%) of a product having melting at 196–197° C.; $[\alpha]_D^{25} = -37°$ (c.=0.4 pyridine).

The fraction obtained by elution of the alumina column with benzene-ethyl acetate mixture of (4:1) is evaporated, and from the residue, by crystallization from an ethanol-water mixture (1:1) 0.71 g. of 5-methyl-3-diphenylmethyl-6-azauracil, M.P. 165° C., is recovered.

0.738 g. of 5-methyl-3-diphenylmethyl-1-(2′,3′,5′-tri-O-benzoyl-β-D-ribofuranosyl)-6-azauracil is hydrogenated for 3 hours in 500 ml. of butanol at 95° C. in the presence of 0.30 g. of 5% palladium on activated carbon. The filtrate is evaporated in vacuo and the oily residue recrystallized from 7 ml. ethanol. In the course of 2 days 0.295 g. of a product melting at 126° C. is eliminated. The mother liquors are evaporated, and the residue is chromatographed on 60 g. silica (deactivated by addition of 5% water) in benzene and ethyl acetate. The fractions that on application on filter paper extinguish the ultraviolet light fluorescence are evaporated, and the dry residue is recrystallized from ethanol. 0.231 g. of a substance melting at 127° C. is obtained. There is obtained altogether 0.508 g. (89%) of a product melting when in pure state at 127–128° C. (ethanol).

$$[\alpha]_D^{25} = -55°$$

(c.=0.4 pyridine).

To a solution of 1.43 g. of 5-methyl-1-(2′,3′,5′-tri-O-benzoyl-β-D-ribofuranosyl)-6-azauracil in 0.1 N CH₃ONa/CH₃OH (40 ml.), after 20 hours' standing at room temperature, a cation-exchanger in the hydrogen cycle (e.g. Dowex-50) is added. After 1 hour the suspension is filtered and the filtrate evaporated to dryness. The dry residue is dissolved in 50 ml. of water, the aqueous solution frozen and water removed by lyophilization. There is obtained 0.498 g. (96%) of a product in the form of a solid foam. According to analytical determination it is a hydrate of 5-methyl-1-β-D-ribofuranosyl-6-azauracil.

What we claim is:

1. Method of producing a compound of the formula:

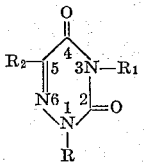

wherein one of the groups R₁ and R₂ is selected from the group consisting of hydrogen, lower alkyl of up to 4 carbon atoms, benzyl and diphenylmethyl, and the other of the groups R₁ and R₂ is selected from the group consisting of lower alkyl of up to 4 carbon atoms, benzyl and diphenylmethyl, and wherein R is selected from the group consisting of ribosyl and desoxyribosyl, which comprises substituting a hydrogen atom in at least one of the positions 3 and 5 of 1-acyl-6-azauracil by a radical selected from the group consisting of lower alkyl of up to 4 carbon atoms, benzyl and diphenylmethyl by reaction of said 1-acyl-6-azauracil with the corresponding compound selected from the group consisting of diazo-lower alkane, phenyl diazo methane and diphenyl diazo methane; hydrolyzing the thus formed compound to the corresponding 6-azauracil substituted by said radical in at least one of the positions 3 and 5; converting the thus formed 6-azauracil substituted by said radical in at least one of the positions 3 and 5 to the corresponding salt thereof selected from the group consisting of the mercuric and chloromercuric salt; reacting the thus formed salt with a glycosyl halide ester selected from the group consisting of ribosyl halide esters and desoxyribosyl halide esters so as to form the corresponding 1-glycosyl ester of said 6-azauracil substituted by said radical in at least one of the positions 3 and 5; and hydrolyzing said glycosyl ester so as to form the corresponding 1-glycosyl-6-azauracil substituted by said radical in at least one of the positions 3 and 5.

2. Method of producing a compound of the formula:

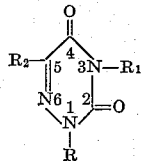

wherein one of the groups R₁ and R₂ is selected from the group consisting of hydrogen, lower alkyl of up to 4 carbon atoms, benzyl and diphenylmethyl, and the other of the groups R₁ and R₂ is selected from the group consisting of lower alkyl of up to 4 carbon atoms, benzyl and diphenylmethyl, and wherein R is selected from the group consisting of ribosyl and desoxyribosyl, which comprises substituting a hydrogen atom in at least one of the positions 3 and 5 of 1-acyl-6-azauracil by a radical selected from the group consisting of lower alkyl of up to 4 carbon atoms, benzyl and diphenylmethyl by reaction of said 1-acyl-6-azauracil with the corresponding compound selected from the group consisting of diazo-lower alkane, phenyl diazo methane and diphenyl diazo methane; hydrolyzing the thus formed compound to the corresponding 6-azauracil substituted by said radical in at least one of the positions 3 and 5; converting the thus formed 6-azauracil substituted by said radical in at least one of the positions 3 and 5 to the corresponding salt thereof selected from the group consisting of the mercuric and chloromercuric salt; reacting the thus formed salt with a glycosyl halide ester selected from the group consisting of ribosyl halide esters and desoxyribosyl halide esters so as to form the corresponding 1-glycosyl ester of said 6-azauracil substituted by said radical in at least one of the positions 3 and 5; and hydrolyzing said glycosyl ester by action of an alkali metal hydroxide so as to form the corresponding 1-glycosyl-6-azauracil substituted by said radical in at least one of the positions 3 and 5.

3. Method of producing a compound of the formula:

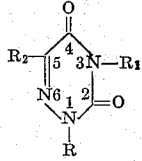

wherein one of the groups R₁ and R₂ is selected from the group consisting of hydrogen, lower alkyl of up to 4 carbon atoms, benzyl and diphenylmethyl, and the other of the groups R₁ and R₂ is selected from the group consisting of lower alkyl of up to 4 carbon atoms, benzyl and diphenylmethyl, and wherein R is selected from the group consisting of ribosyl and desoxyribosyl, which comprises substituting a hydrogen atom in at least one of the positions 3 and 5 of 1-acyl-6-azauracil by a radical selected from the group consisting of lower alkyl of up to 4 carbon atoms, benzyl and diphenylmethyl by reaction of said 1-acyl-6-azauracil with the corresponding compound selected from the group consisting of diazo-lower alkane, phenyl diazo methane and diphenyl diazo methane; hydrolyzing the thus formed compound to the corresponding 6-azauracil substituted by said radical in at least one of the positions 3 and 5; converting the thus formed 6-azauracil substituted by said radical in at least one of the positions 3 and 5 to the corresponding salt thereof selected from the group consisting of the mercuric and chloromercuric salt; reacting the thus formed salt with a glycosyl halide ester selected from the group consisting of ribosyl halide esters and desoxyribosyl halide esters so as to form the corresponding 1-glycosyl ester of said 6-azauracil substituted by said radical in at least one of the positions 3 and 5; and hydrolyzing said glycosyl ester by action of an aqueous solution of an alkali metal hydroxide so as to form the corresponding 1-glycosyl-6-azauracil substituted by said radical in at least one of the positions 3 and 5.

4. Method of producing a compound of the formula:

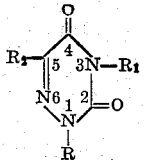

wherein one of the groups $R_1$ and $R_2$ is selected from the group consisting of hydrogen, lower alkyl of up to 4 carbon atoms, benzyl and diphenylmethyl, and the other of the groups $R_1$ and $R_2$ is selected from the group consisting of lower alkyl of up to 4 carbon atoms, benzyl and diphenylmethyl, and wherein R is selected from the group consisting of ribosyl and desoxyribosyl, which comprises substituting a hydrogen atom in at least one of the positions 3 and 5 of 1-acyl-6-azauracil by a radical selected from the group consisting of lower alkyl of up to 4 carbon atoms, benzyl and diphenylmethyl by reaction of said 1-acyl-6-azauracil with the corresponding compound selected from the group consisting of diazo-lower alkane, phenyl diazo methane and diphenyl diazo methane; hydrolyzing the thus formed compound to the corresponding 6-azauracil substituted by said radical in at least one of the positions 3 and 5; converting the thus formed 6-azauracil substituted by said radical in at least one of the positions 3 and 5 to the corresponding salt thereof selected from the group consisting of the mercuric and chloromercuric salt; reacting the thus formed salt with a glycosyl halide ester selected from the group consisting of ribosyl halide esters and desoxyribosyl halide esters so as to form the corresponding 1-glycosyl ester of said 6-azauracil substituted by said radical in at least one of the positions 3 and 5; and hydrolyzing said glycosyl ester by action of an aqueous alcoholic solution of an alkali metal hydroxide so as to form the corresponding 1-glycosyl-6-azauracil substituted by said radical in at least one of the positions 3 and 5.

5. Method of producing a compound of the formula:

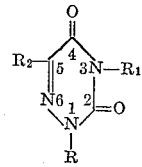

wherein one of the groups $R_1$ and $R_2$ is selected from the group consisting of hydrogen, lower alkyl of up to 4 carbon atoms, benzyl and diphenylmethyl, and the other of the groups $R_1$ and $R_2$ is selected from the group consisting of lower alkyl of up to 4 carbon atoms, benzyl and diphenylmethyl, and wherein R is selected from the group consisting of ribosyl and desoxyribosyl, which comprises substituting a hydrogen atom in at least one of the positions 3 and 5 of 1-acyl-6-azauracil by a radical selected from the group consisting of lower alkyl of up to 4 carbon atoms, benzyl and diphenyl methyl by reaction of said 1-acyl-6-azauracil with the corresponding compound selected from the group consisting of diazo-lower alkane, phenyl diazo methane and diphenyl diazo methane; hydrolyzing the thus formed compound to the corresponding 6-azauracil substituted by said radical in at least one of the positions 3 and 5; converting the thus formed 6-azauracil substituted by said radical in at least one of the positions 3 and 5 to the corresponding salt thereof selected from the group consisting of the mercuric and chloromercuric salt; reacting the thus formed salt with a glycosyl halide ester selected from the group consisting of ribosyl halide esters and desoxyribosyl halide esters so as to form the corresponding 1-glycosyl ester of said 6-azauracil substituted by said radical in at least one of the positions 3 and 5; and subjecting said glycosyl ester to alcoholysis so as to form the corresponding 1-glycosyl-6-azauracil substituted by said radical in at least one of the positions 3 and 5.

6. A method of producing a compound of the formula:

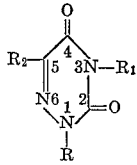

wherein one of the groups $R_1$ and $R_2$ is selected from the group consisting of hydrogen, lower alkyl of up to 4 carbon atoms, benzyl and diphenylmethyl, and the other of the groups $R_1$ and $R_2$ is selected from the group consisting of lower alkyl of up to 4 carbon atoms, benzyl and diphenylmethyl, and wherein R is selected from the group consisting of ribosyl and desoxyribosyl, which comprises substituting a hydrogen atom in at least one of the positions 3 and 5 of 1-acyl-6-azauracil by a radical selected from the group consisting of lower alkyl of up to 4 carbon atoms, benzyl and diphenyl methyl by reaction of said 1-acyl-6-azauracil with the corresponding compound selected from the group consisting of diazo-lower alkane, phenyl diazo methane and diphenyl diazo methane; hydrolyzing the thus formed compound to the corresponding 6-azauracil substituted by said radical in at least one of the positions 3 and 5; converting the thus formed 6-azauracil substituted by said radical in at least one of the positions 3 and 5 to the corresponding salt thereof selected from the group consisting of the mercuric and chloromercuric salt; reacting the thus formed salt with a glycosyl halide ester selected from the group consisting of ribosyl halide esters and desoxyribosyl halide esters so as to form the corresponding 1-glycosyl ester of said 6-azauracil substituted by said radical in at least one of the positions 3 and 5; and subjecting said glycosyl ester to alcoholysis by means of methanol and sodium methylate so as to form the corresponding 1-glycosyl-6-azauracil substituted by said radical in at least one of the positions 3 and 5.

7. Method of producing a compound of the formula:

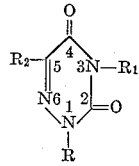

wherein one of the groups $R_1$ and $R_2$ is selected from the group consisting of hydrogen, lower alkyl of up to 4 carbon atoms, benzyl and diphenylmethyl, and the other of the groups $R_1$ and $R_2$ is selected from the group consisting of lower alkyl of up to 4 carbon atoms, benzyl and diphenylmethyl, and wherein R is selected from the group consisting of ribosyl and desoxyribosyl, which comprises substituting a hydrogen atom in at least one of the positions 3 and 5 of 1-acyl-6-azauracil by a radical selected from the group consisting of lower alkyl of up to 4 carbon atoms, benzyl and diphenylmethyl by reaction of said 1-acyl-6-azauracil with the corresponding compound selected from the group consisting of diazo-lower alkane, phenyl diazo methane and diphenyl diazo methane; hydrolyzing the thus formed compound to the corresponding 6-azauracil substituted by said radical in at least one of the positions 3 and 5; converting the thus formed 6-azauracil substituted by said radical in at least one of the positions 3 and 5 to the corresponding salt thereof selected from the group consisting of the mercuric and chloromercuric salt; reacting the thus formed salt with a glycosyl halide ester selected from the group consisting of ribosyl halide esters and desoxyribosyl halide esters so as to form the corresponding 1-glycosyl ester of said 6-azauracil substituted by said radical in at least one of the positions 3 and 5; and subjecting said glycosyl ester to ammonolysis so as to form the corresponding 1-glycosyl-6-azauracil substituted by said radical in at least one of the positions 3 and 5.

8. Method of producing a compound of the formula:

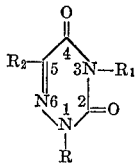

wherein one of the groups $R_1$ and $R_2$ is selected from the group consisting of hydrogen, lower alkyl of up to 4 carbon atoms, benzyl and diphenylmethyl, and the other of the groups $R_1$ and $R_2$ is selected from the group consisting of lower alkyl of up to 4 carbon atoms, benzyl and diphenylmethyl, and wherein R is selected from the group consisting of ribosyl and desoxyribosyl, which comprises substituting a hydrogen atom in at least one of the positions 3 and 5 of 1-acyl-6-azauracil by a radical selected from the group consisting of lower alkyl of up to 4 carbon atoms, benzyl and diphenylmethyl by reaction of said 1-acyl-6-azauracil with the corresponding compound selected from the group consisting of diazo-lower alkane, phenyl diazo methane and diphenyl diazo methane; hydrolyzing the thus formed compound to the corresponding 6-azauracil substituted by said radical in at least one of the positions 3 and 5; converting the thus formed 6-azauracil substituted by said radical in at least one of the positions 3 and 5 to the corresponding salt thereof selected from the group consisting of the mercuric and chloromercuric salt; reacting the thus formed salt with a glycosyl halide ester selected from the group consisting of ribosyl halide esters and desoxyribosyl halide esters so as to form the corresponding 1-glycosyl ester of said 6-azauracil substituted by said radical in at least one of the positions 3 and 5; and subjecting said glycosyl ester to ammonolysis by means of ammonia in ethanol so as to form the corresponding 1-glycosyl-6-azauracil substituted by said radical in at least one of the positions 3 and 5.

9. The method which comprises reacting 1-acetyl-6-azauracil with diazomethane, so as to form 3-methyl-1-acetyl-6-azauracil; hydrolyzing said 3-methyl-1-acetyl-6-azauracil to the corresponding 3-methyl-6-azauracil; reacting said 3-methyl-6-azauracil with mercuric chloride so as to form the corresponding chloromercuric salt of 3-methyl-6-azauracil; reacting said chloromercuric salt with 2,3,5-tri-O-benzoyl-D-ribofuranosyl chloride so as to form the corresponding ester; and reacting the thus formed ester with sodium methylate, thereby forming the corresponding 3-methyl-6-azauridine.

10. The method which comprises reacting 1-acetyl-6-azauracil with diphenyl diazo methane so as to form the corresponding 3-diphenylmethyl-6-azauracil; hydrolyzing said 3-diphenylmethyl-1-acetyl-6-azauracil to the corresponding 3-diphenylmethyl-6-azauracil; forming the mercuric salt of said 3-diphenylmethyl-6-azauracil; reacting said mercuric salt with 2,3,5-tri-O-benzoyl-D-ribofuranosyl chloride so as to form the corresponding ester; hydrogenating said ester to the corresponding 6-azauridine tribenzoate; and reacting said 6-azauridine tribenzoate with an ethanolic ammonia solution so as to form the corresponding 6-azauridine.

11. The method which comprises reacting 1-acetyl-6-azauracil with diphenyl diazo methane so as to form the corresponding 3-diphenylmethyl-6-azauracil; hydrolyzing said 3-diphenylmethyl-1-acetyl-6-azauracil to the corresponding 3-diphenylmethyl-6-azauracil; forming the mercuric salt of said 3-diphenylmethyl-6-azauracil; reacting said mercuric salt with 2,3,5-tri-O-benzoyl-D-ribofuranosyl chloride so as to form the corresponding ester; hydrogenating said ester to the corresponding 6-azauridine tribenzoate; and reacting said 6-azauridine tribenzoate with sodium methylate so as to form the corresponding 6-azauridine.

12. The method which compriseses reacting 5-methyl-6-azauracil with trifluoroacetic acid anhydride so as to form the corresponding 5-methyl-1-trifluoroacetyl-6-azauracil; reacting said 5-methyl-1-trifluoroacetyl-6-azauracil with diphenyl diazomethane so as to form the corresponding 5-methyl-3-diphenylmethyl-1-trifluoroacetyl-6-azauracil; hydrolyzing said 5-methyl-3-diphenylmethyl-1-trifluoroacetyl-6-azauracil to the corresponding 5-methyl-3-diphenylmethyl-6-azauracil; forming the mercuric salt of said 5-phenyl-3-diphenylmethyl-6-azauracil; reacting said mercuric salt with 2,3,5-tri-O-benzoyl-D-ribofuranosyl chloride so as to form the corresponding ester; hydrogenating said ester to the corresponding 5-methyl-6-azauridine tribenzoate; and hydrolyzing said 5-methyl-6-azauridine tribenzoate to the corresponding 5-methyl-6-azauridine.

References Cited by the Examiner

UNITED STATES PATENTS 3,041,335   6/62   Hoffer _____ 260—211.5 X

OTHER REFERENCES

Brederick: Chemische Berichte, vol. 80, pages 401–405 (1947).

Fox et al.: J.A.C.S., vol. 80, pages 1669–1675 (1958).

LEWIS GOTTS, *Primary Examiner.*

A. LOUIS MANACELL, *Examiner.*